2,143,087

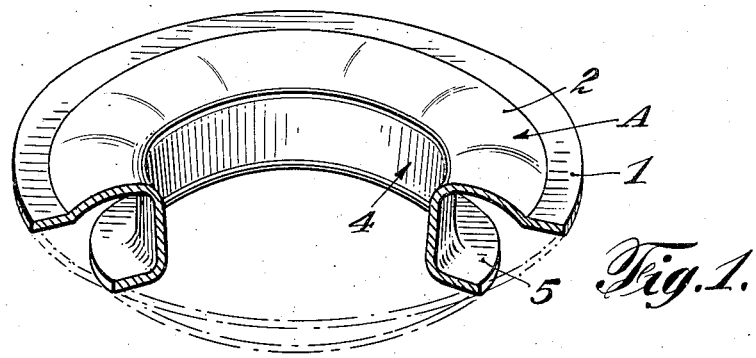
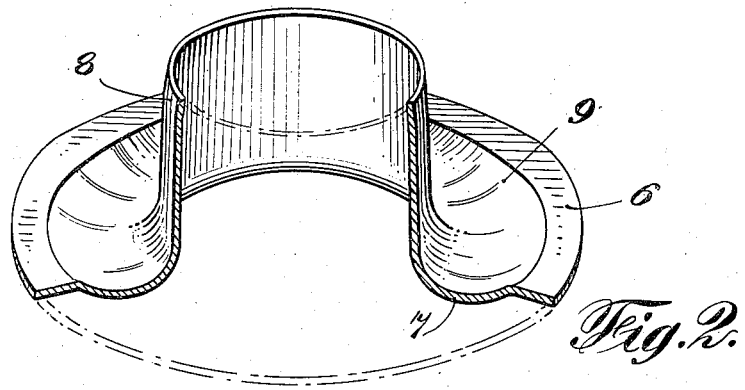
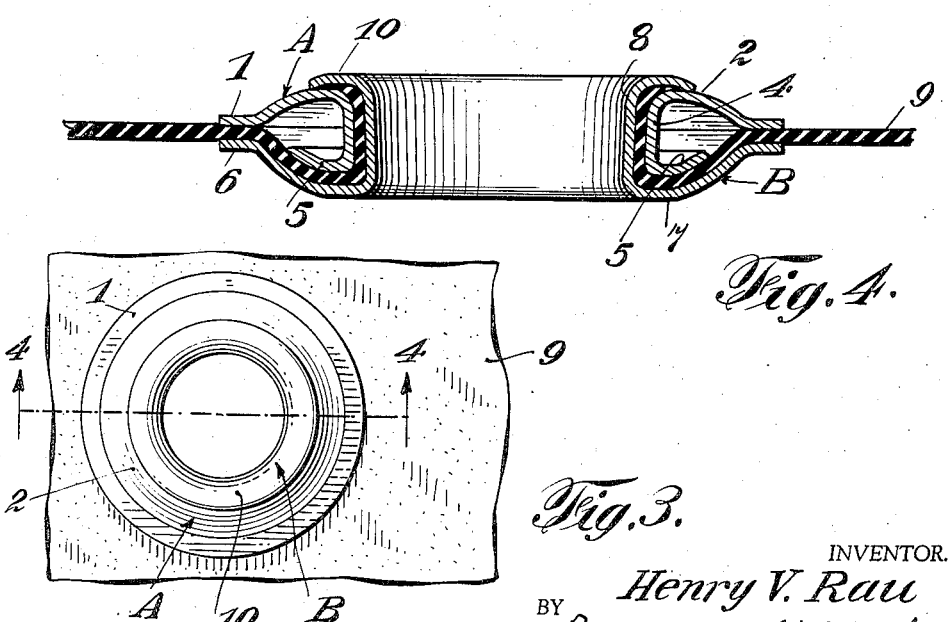
INVENTOR.
Henry V. Rau
BY Ramsey, Kent, Chisholm & Lutz
his ATTORNEYS Patented Jan. 10, 1939

UNITED STATES PATENT OFFICE 2,143,087

CLAMP GROMMET

Henry V. Rau, Amityville, N. Y., assignor to Edwin B. Stimpson Company, Brooklyn, N. Y., a corporation of New York Application March 12, 1937, Serial No. 130,491

2 Claims. (Cl. 24—141)

The present invention relates to an eyelet member of the character generally designated as a "grommet".

The present invention comprises a grommet formed with a pair of flanged telescoping members so constructed as to carry a portion of the sheet material, in which the grommet is set, in between the eyelet portions of the members. The outer telescoping member has an outwardly extending rim so that when the rivet is expanded, the eyelet portions of the members tightly clamp the sheet material between the members at substantially right angles to any radial stress on the material around the grommet. This construction results in substantially a snubbing action of the material and thereby greatly increases the locking effect of the grommet to the sheet material.

Grommets are frequently set in sheet rubber and the prior art grommets easily pull out of the sheet rubber which reduces in thickness when stretched. The grommet of the present invention when applied to sheet rubber remains securely locked in place even though the rubber is subjected to substantial stress radially relative to the grommet since the clamping action of the flanges and the rim bearing against the lower flange prevents the inner locked portion of the rubber from being stretched.

Other and further objects of the present invention will in part be obvious and will in part be pointed out hereinafter in the specification following.

The drawing and the specification disclose the preferred form of the present invention, but it is to be understood that the drawing and description are to be considered as illustrative and not to be construed in a limiting sense.

Fig. 1 is a perspective view of one of the grommet members with a portion thereof broken away to illustrate the cross-section formation. Fig. 1 illustrates the member prior to its being applied as a finished assembly.

Fig. 2 is a view illustrating the other member of the grommet and comprises substantially a hollow rivet adapted to telescope through the member illustrated in Fig. 1. A portion of the member illustrated in Fig. 2 is broken away to show the cross-section form of this member.

Fig. 3 is a plan view of an assembly of the devices shown in Figs. 1 and 2 with the complete grommet inserted in sheet rubber.

Fig. 4 is a cross-section on line 4—4 of the grommet and sheet rubber illustrated in Fig. 3.

Referring now to Figs. 1 and 2 which illustrate the grommet members prior to their assembly, Fig. 1 shows what may be termed for convenience as the upper grommet member which comprises a sheet metal member A of circular form having a flat flange 1 adjacent an annular raised portion 2 which leads to a cylindrical part 4 that terminates in a narrow outwardly extending rim 5.

The grommet member illustrated in Fig. 2 which may for convenience be referred to as the lower grommet member comprises substantially a tubular rivet having a head portion of circular form and of a single piece of sheet metal and being provided with a flat flange 6 connected with a curved portion 7 that leads to the hollow rivet eyelet portion 8 which is substantially in the form of a cylinder having a lightly reduced upper end. The upper member A also has a head portion integral with a hollow cylindrical portion 4 provided with a rim 5, and is adapted to be telescoped over the lower member B with sheet material extending between the members A and B as they are telescoped and after the telescoping action is completed, the slightly reduced upper end of the member 8 is expanded in accordance with the operation of setting a hollow rivet so that the expanded end overlaps a part of the portion 2 of the upper member A and thus securely locks the members together.

Fig. 3 illustrates a grommet in accordance with the present invention set in a sheet of rubber 9. Fig. 3 is a plan view looking down upon the upper member A and showing the end of the lower member B as it is riveted over the upper member A.

Fig. 4 which is a cross-section on line 4—4 through the construction shown in Fig. 3 and illustrates the interlock of the grommet with the sheet material 9 which in the present instance is illustrated as sheet rubber. It will be observed that the sheet rubber 9 extends between the cylindrical portion 4 of the member A and the tubular portion 8 of the member B. The material is carried into this position when the grommet members are telescoped due to the fact that the external diameter of the member 8 is smaller than the internal diameter of the member 4. Then as the riveting action is completed by suitable riveting tools common in the art, the upper end 10 of the tubular member 8 is expanded outwardly over a portion of the curved part 2 of the member A. This curved part 2 is slightly flattened due to the pressure applied when the hollow rivet B is set in the member A. The curved portion 7 of the member B is also slightly flattened. During this setting operation, the sheet rubber 9 is also clamped tightly between the rim 5 on the member A and the inner side wall of the slightly flattened curved portion 7 of the member B. It is also clamped between the tubular member 8 of the member B and the cylindrical portion 4 of the member A. These parts designated by reference numbers 8 and 4 are moved toward each other during the riveting operation and thus the portion of the rubber 9 between these parts is very tightly clamped in position.

The flanges 1 and 6 also exert a clamping action on the sheet material which in the present case is rubber and further acts to secure the grommet in position. It will be observed that any stress applied to the sheet material in an outward radial direction from the center of the grommet, as for example, if applied to the sheet rubber outside of the grommet, is resisted by the snubbing action of the sheet material around the cylindrical part 4 and the rim 5 of the grommet member A, against which the inner portion of the rubber is tightly clamped by the hollow rivet 8.

The grommet comprising the present invention is strong and efficient and transmits forces, applied to the grommet, directly to the sheet material without danger of the grommet pulling out of place.

What I claim is:

1. An article of manufacture comprising a grommet having a pair of members, one of said members being a rivet having a cupped flange portion and a hollow stem portion, the other of said members having a cupped flange portion and a hollow tubular portion extending in the opposite direction to said stem and adapted to be telescoped over the said hollow stem portion of said rivet, the end of said tubular portion having an outwardly extending rim.

2. A grommet comprising a pair of telescoping members adapted to be set in sheet material, one of said telescoping members having a tubular cylindrical portion adapted to extend through the sheet material, said tubular cylindrical portion being integral with a head portion adapted to bear against said sheet material, the other of said telescoping members having a hollow cylindrical portion of larger diameter than said tubular cylindrical portion to permit said sheet material to extend between said tubular cylindrical portion and said hollow cylindrical portion, said hollow cylindrical portion being integral at one end with a head portion and at the other end with an outwardly extending rim, said tubular cylindrical portion being adapted to be expanded outwardly at its end to rivet said members together and to clamp said sheet material between said heads and also between said rim and the head integral with said tubular cylindrical portion.

HENRY V. RAU.